April 28, 1925.
W. O. RENKIN
1,535,132
PULVERIZED FUEL BURNING APPARATUS
Filed Aug. 4, 1923
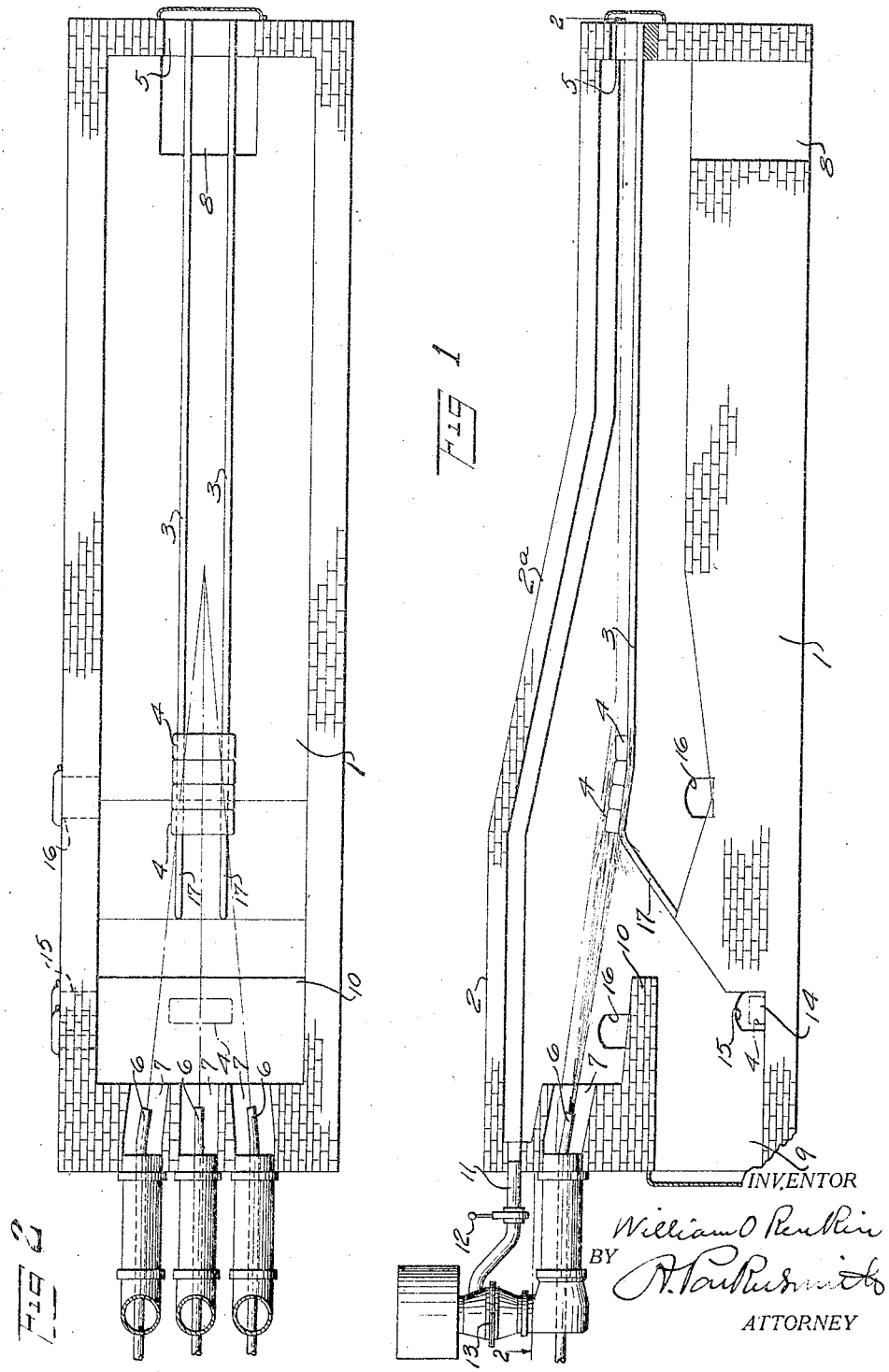

Patented Apr. 28, 1925.

1,535,132

UNITED STATES PATENT OFFICE.

WILLIAM O. RENKIN, OF ORADELL, NEW JERSEY, ASSIGNOR TO FULLER-LEHIGH COMPANY, A CORPORATION OF PENNSYLVANIA.

PULVERIZED-FUEL-BURNING APPARATUS.

Application filed August 4, 1923. Serial No. 655,562.

*To all whom it may concern:*

Be it known that I, WILLIAM O. RENKIN, a citizen of the United States of America, residing at Oradell, Bergen County, New Jersey, have invented certain new and useful Improvements in Pulverized-Fuel-Burning Apparatus, of which the following is a specification.

While my invention relates generally to furnaces of nearly all standard types, it is particularly designed for embodiment in the particular classes known as reheating and annealing furnaces. In any case the primary purpose and object of the invention is to concentrate the stream of heated products of combustion on the object to be heated and at the same time to protect the roof and walls of the combustion chamber as far as possible from excessive heating. To fully understand the essential novelty of the invention it should first be realized that one great drawback to the general adoption in the past of pulverized fuel burning apparatus has been the highly destructive effect on furnace linings, bridge walls and other surfaces, resulting from the intense heat produced by the perfect combustion possible with this system. In short, the great efficiency of the system in fuel consumption has been more or less neutralized by its destructive action on plant employed. To avoid the latter it has been necessary in commercial practice to employ an excess of air much greater than that needed for theoretically perfect combustion, which has reduced the temperature in the combustion chamber to a degree which the refractories could withstand. This air has had to be heated and has escaped to the chimney with a large part of the heat absorbed by it, consequently the fuel efficiency has dropped to a point that left little advantage over older forms of furnaces. The present invention avoids both these conflicting difficulties by concentrating the heat on the object to be heated in the furnace, instead of spreading it around on linings, bridge walls, etc., and then further protects these by spreading over them a small amount of cooling air employed, thus providing the most effective heat insulation for the roof and walls of the combustion chamber. This being done, the supplemental air supplied with the stream of pulverized fuel may be kept down to the theoretical quantity required for producing complete combustion thereof, and the greatest possible heat is then generated at the desired point of application, with the least possible consumption of fuel, and without destructive action on the furnace refractories.

The best form of apparatus at present known to me embodying one form of my invention is illustrated in the accompanying sheet of drawings in which:

Fig. 1 is a vertical longitudinal section of a reheating furnace to which my invention has been applied, and, Fig. 2 is a horizontal section thereof on line 2—2 of Fig. 1.

Throughout the drawings like reference characters indicate like parts. 1 is the furnace bed, and 2, the roof of the combustion chamber having the downwardly inclined section 2ª. The ingots 4, 4, to be reheated, rest on skeleton skids 3 along which they are shoved after being charged through doorway 5.

Heat is concentrated on the foremost ingots 4 in the form of a stream of the products of combustion delivered from burner tubes 6 in supplemental air passages 7, both of which are inclined downwardly so that the issuing streams of pulverized fuel borne on air jets, and supplemental air for supporting combustion are directed at or slightly below the said ingots 4, 4. The reheated ingots when pushed over the crown of the skids slide down incline 17 into discharge pit 9 where one is shown at 14. In due course the ingots in pit 9 are forced out through discharge port 15. The burnt gases escape through flue 8. Any ash and scale collecting on the furnace bed or on the roof 10 of the discharge pit may be removed through cleaning ports 16, 16.

As shown in Fig. 2 the nozzles 6 and 7 are so directed horizontally that the streams from all of them converge on the first few members of the procession of ingots being pushed up along skids 3.

The amount of supplemental air supplied from each nozzle 7 may be so regulated by gate 13, as to supply the exact amount, or nearly the exact amount, required for combination with the pulverized fuel delivered by corresponding nozzle 6, to produce complete combustion.

11 represents a nozzle for supplying pure cold air alone which may be connected to the supplemental air conduit back of gate 13, and which is controlled by gate 12. Preferably there would be a nozzle 11 for each fuel nozzle 6, located above the latter, and extending horizontally if nozzle 6 is inclined downwardly. That is to say the fuel nozzle should be inclined at a slight angle from the air nozzle 11, so that the film of pure cold air formed by the spreading of the jets from 11, 11, will not mix with the air and fuel discharged from 6 and 7 and forming the combustible mixture. This desired action can be further assured if the fuel nozzles 6 discharge in a plane parallel to the inclined section 2$^a$ of the roof of the combustion chamber.

In the operation of my invention the pulverized fuel becomes incandescent as soon as it enters the combustion chamber from nozzles 6 and burns to complete combustion with the supplemental air from passages 7 before leaving the combustion chamber through flue 8. The streams of hot gases resulting are concentrated on ingots 4. The insulating blanket of cooler air formed by jets from nozzles 11, 11, stretches along the inner surface of roof 2, and, when expanded by heat and internal pressure, also reaches down along the inner surface of the side walls of the combustion chamber, protecting all of these surfaces from the hot gases which have been concentrated on 4, 4. There is no bridge wall or other furnace lining surface on which the flames can focus with blow-pipe action to melt down the protecting refractories. As a result, the maximum fuel economy and useful application of heat generated are attained, while the usual concurrent destructive action of such heat on the furnace linings is avoided. Of course the concentration of the fuel jets horizontally leaves unheated spaces between the locus of combustion so formed and the side walls of the combustion chamber, in which spaces protecting layers of pure air may easily collect and remain.

Having described my invention, I claim:

1. In a furnace designed to operate with pulverized fuel, the combination, with a nozzle extending through one wall of the furnace and means for discharging therethrough into the combustion chamber of the furnace a mixture of pulverized fuel and air, of a nozzle located above said fuel nozzle and adapted to discharge air alone along under, and substantially parallel to the under surface of the roof of said combustion chamber.

2. An apparatus such as set forth in claim 1 in which the fuel nozzle is inclined downwardly at a slight angle from the last mentioned air nozzle.

3. An apparatus such as set forth in claim 1 in which there are a plurality of fuel nozzles adapted to project streams of fuel converging at a predetermined point in the combustion chamber.

4. An apparatus such as set forth in claim 1 in which there are a plurality of fuel nozzles adapted to project streams of fuel converging at a predetermined point in the combustion chamber and all inclined at a slight angle from the above mentioned air nozzles.

5. In a heating furnace adapted to operate with pulverized fuel the combination, with a set of skeleton skids raised above the furnace bed and along which skids the objects to be heated may be fed, and pulverized fuel nozzles extending through one wall of the furnace and adapted to converge streams of combustion products on said object carried by the skids, of means for supplying pure, cold air and a nozzle located above said fuel nozzles and adapted to discharge said pure, cold air alone along under, and substantially parallel to the under surface of the roof of the combustion chamber.

6. An apparatus such as set forth in claim 5 in which the fuel nozzles are inclined downwardly at a slight angle from the plane of the last mentioned air nozzle.

7. In a furnace designed to operate with pulverized fuel, the combination of a combustion chamber having a section of its roof inclined downwardly, pulverized fuel nozzles extending through one wall of the combustion chamber and also inclined downwardly in a plane approximately parallel to the said inclined section of the roof of said chamber, and nozzles extending horizontally and adapted to discharge air alone along the under side of the roof of said combustion chamber.

WILLIAM O. RENKIN.

Witnesses:
G. G. OWENS,
LILLIAN V. MICHAEL.